Oct. 20, 1931.                F. M. NEFF                1,828,151
                           HEARING APPLIANCE
                         Filed Dec. 26, 1930
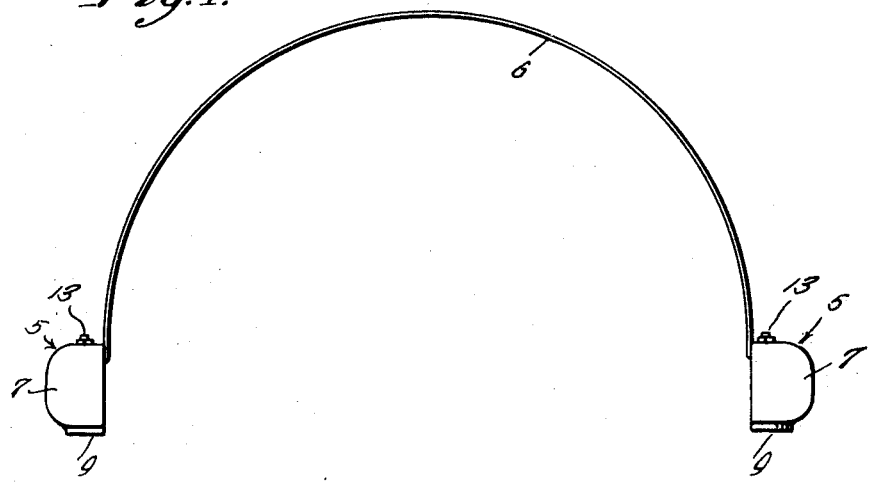
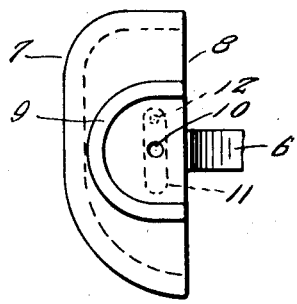 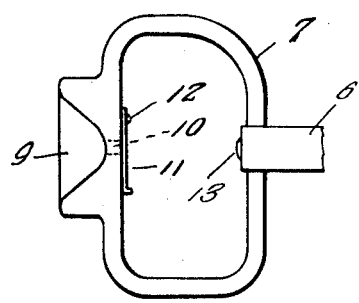
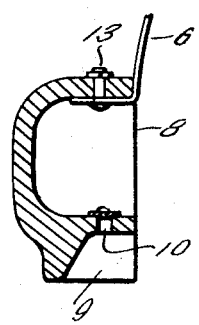
Inventor
Frank M. Neff
By Clarence A. O'Brien
                    Attorney Patented Oct. 20, 1931

1,828,151

UNITED STATES PATENT OFFICE

FRANK M. NEFF, OF LOS GATOS, CALIFORNIA

HEARING APPLIANCE

Application filed December 26, 1930. Serial No. 504,949.

This invention relates to new and useful improvements in hearing appliances for deaf persons.

The principal object of this invention is to provide an appliance which can be constructed at an extremely low cost for sale to persons of nominal means.

Another important object of the invention is to provide a simple hearing appliance which will greatly assist persons who are losing their hearing.

These and other important objects and advantages of the invention will become apparent to the reader of the following specification and claims.

In the drawings:—

Figure 1 represents a front elevational view of the headgear and appliance in its entirety.

Fig. 2 represents a bottom plan view of the ear units.

Fig. 3 represents an inside elevational view of one of the units.

Fig. 4 represents a vertical sectional view through one of the units.

Referring to the drawings wherein like numerals designate like parts, it can be seen that the appliance is made up of two ear units, each generally referred to by numeral 5. These are connected together by a head band 6.

A description of one of the ear units will suffice for both. Each ear unit consists of a shell 7 open at one side as at 8 so as to receive the ear. The lower portion of the shell 7 is provided with a U-shaped flange 9 and an opening 10 extends through the bottom portion of the shell in the manner shown in Fig. 4. Within each shell 7 thereof is secured a valve plate 11, one end of which is pivotally connected to the bottom of the shell as at 12. This valve plate is adapted to be adjusted over the opening 10 to vary the exposure thereof.

It will also be observed, that the area within the U-shaped flange 9 is constricted toward the opening 10, this in the nature of a transmitter mouthpiece, so as to catch sounds more readily. Suitable means 13 can be used for securing the ends of the head band 6, to the shell 7, as in the manner shown in Fig. 4.

The principle of the unit is somewhat like that provided by a sea shell and as is apparent from the drawings, the intensity of the amplified sounds can be regulated by the valve 11.

While the specification sets forth the invention in specific terms, it is to be understood that numerous changes in the shape, size and materials may be resorted to without departing from the spirit and scope of the invention as claimed hereinafter.

Having thus described my invention, what I claim as new is:—

1. A hearing appliance comprising a shell open at that side which contacts the ear, said shell being provided with an opening in its lower wall which communicates with the interior of the shell, and a flange projecting from the shell and circumventing the said opening.

2. A hearing appliance of the character described comprising a shell, said shell being provided with an opening therethrough, which communicates with the interior of the shell and a valve mounted within the shell for adjustable disposition over the opening.

3. A hearing appliance of the character described comprising a shell, for disposition over a human ear, said shell being provided with an opening through the bottom thereof which communicates with the interior of the shell, and a valve for adjustable disposition over the said opening.

In testimony whereof I affix my signature.

FRANK M. NEFF.